Nov. 19, 1968     G. R. BARTON ET AL     3,412,388
FREQUENCY MONITOR

Filed July 8, 1965     2 Sheets-Sheet 1

INVENTORS
GEORGE R. BARTON
GEORGE W. PATE, Jr.

BY

*Joseph A. Hill*
ATTORNEY

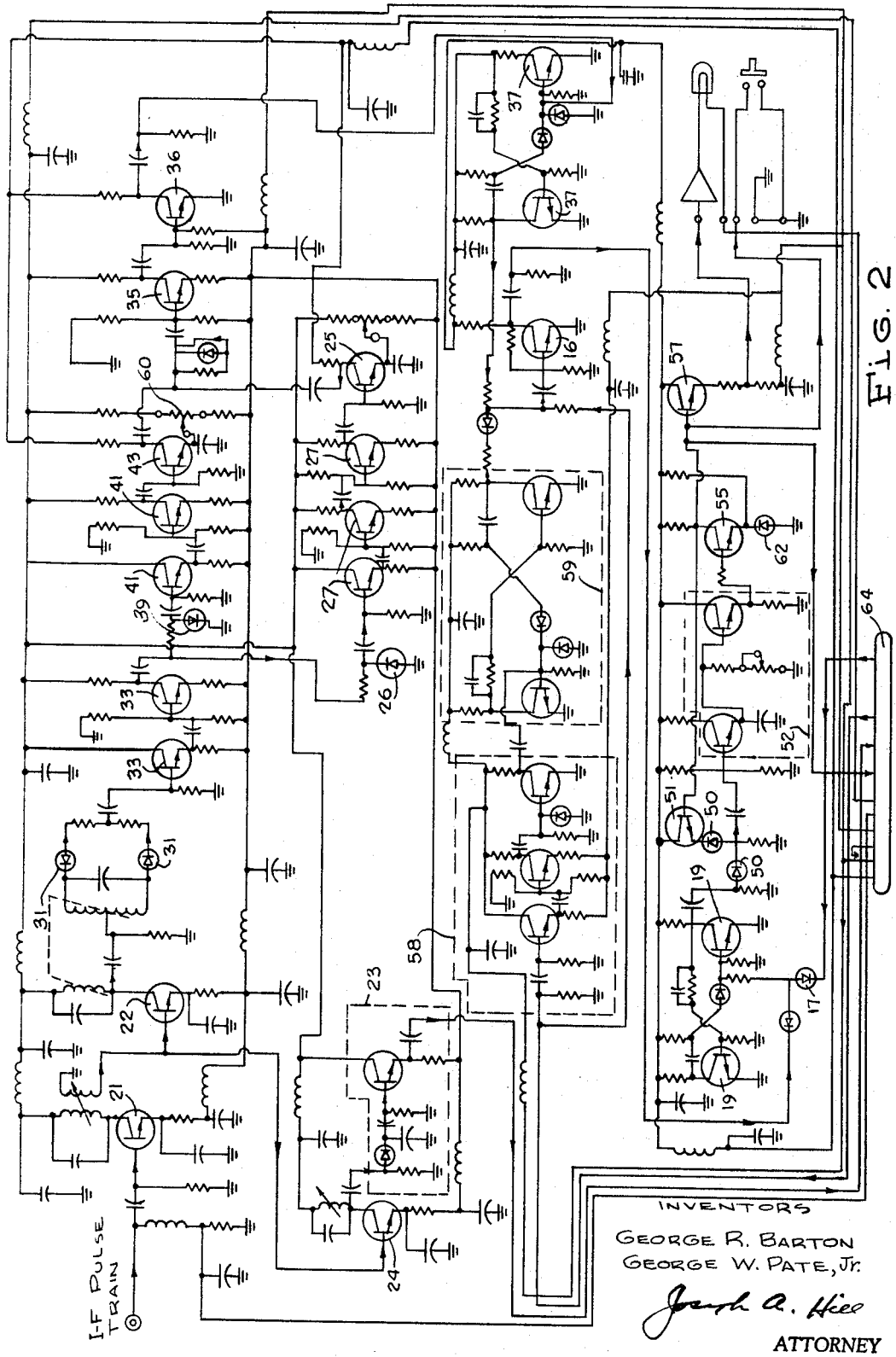

3,412,388
FREQUENCY MONITOR

George R. Barton, Duneden, and George W. Pate, Jr., Clearwater, Fla., assignors to the United States of America as represented by the Secretary of the Army and/or the Administrator of the Federal Aviation Agency
Filed July 8, 1965, Ser. No. 470,653
3 Claims. (Cl. 340—248)

This invention relates to frequency monitors generally and in particular to the type which monitors the center frequency of pulsed radio frequencies or microwave carrier signals. The invention operates to provide a "GO" indication when the monitored carrier frequency remains within predetermined limits. When the carrier frequency deviates beyond these predetermined limits, a "NO GO" situation indication prevails. This device incorporates the use of an alarm system to indicate the "GO"–"NO GO" condition. An alarm condition indicates a "NO GO" situation; a no alarm condition indicates a "GO" situation.

A feature of the invention lies in the fact that monitoring is accomplished on a pulse-to-pulse basis. This makes the circuit adaptable for counting the number of pulses which exceed preset limits. In operation, the alarm circuitry of the monitor functions as follows. If the carrier is correct, a pulse is applied to an alarm circuit to hold the visual or audible alarm in the "OFF" condition. When the carrier frequency drifts outside of the acceptable region, the pulse which would normally pass into the alarm circuit is inhibited. The circuit may be adjusted at the will of the operator so that any one missing pulse will trigger and hold the alarm circuit in the "NO GO" condition. In one application the range of adjustment provided in the alarm circuit allows a specified plurality of pulses which have deviated from the center frequency to pass before the alarm is triggered.

The object of this invention is to provide a monitor which detects the deviation of energy from a center frequency by providing two parallel channels one of which blocks on-center frequency input energy while passing off-center frequency energy. To complete the monitoring function it is necessary to provide means for storing the output of one of the channels, along with means for inhibiting the output of one of the channels with the off-center frequency of the other channel. A threshold circuit is used in conjunction with the storage means in order to activate an alarm circuit to indicate frequency deviations. Other objects will become apparent and the operation of the invention will be understood by reference to the following drawings:

FIG. 2 is a detailed circuit diagram of the system.

Figure 1:
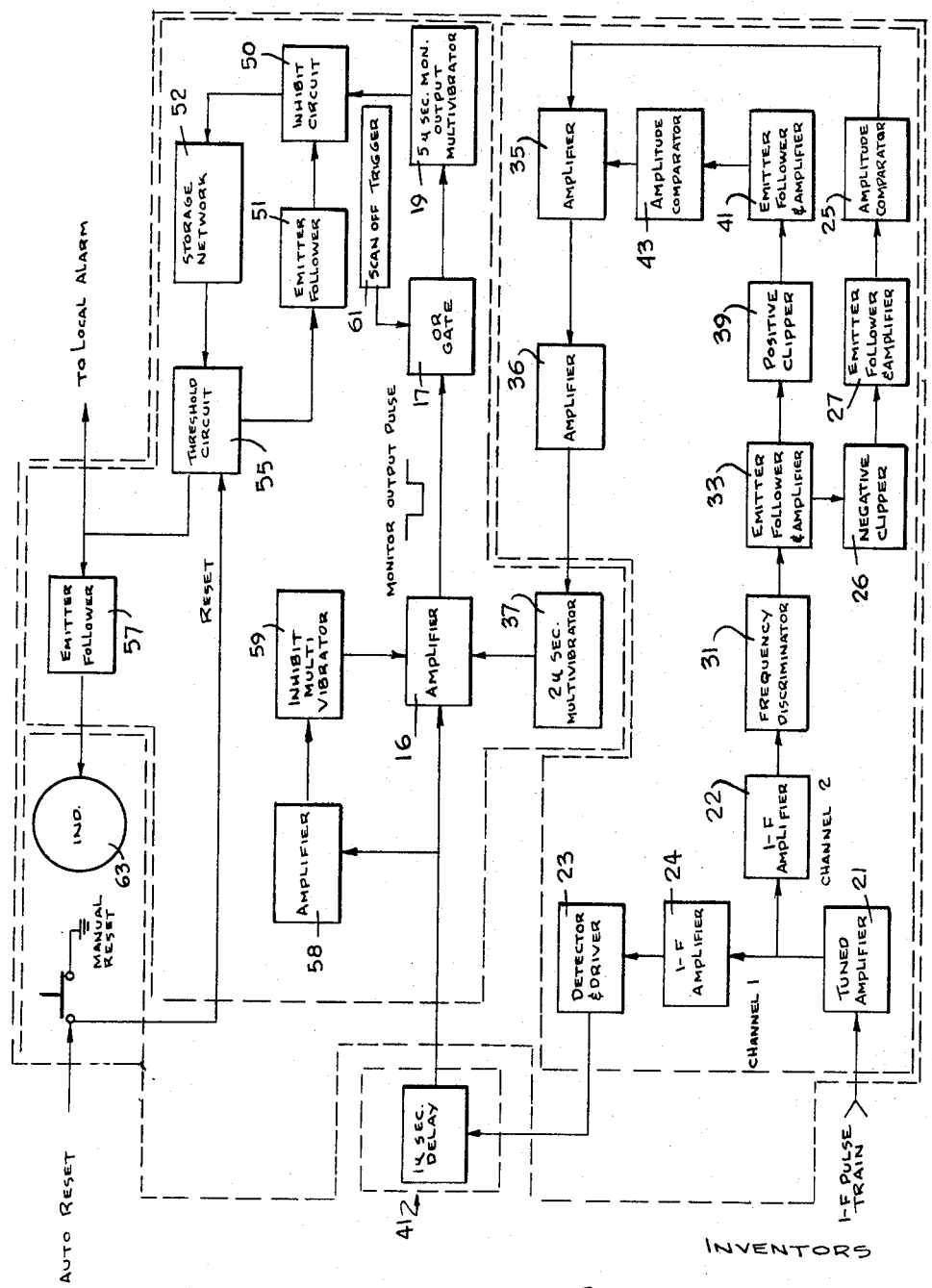
FIG. 1 is a block diagram of the circuit arrangement involved.

The input to this system is obtained from the input mixer in a microwave assembly where the incoming R.F. pulses are converted to I.F. pulses by conventional means. This input pulse train is amplified by the tuned amplifier 21. The circuitry provides the output of amplifier 21 a choice of two channels. A frequency discriminator 31 is center-tuned to the exact carrier frequency in question so that no output is obtained when the input pulse is exactly on the center frequency. When this condition occurs the pulse train cannot travel through channel 2. Its path of travel is now limited to channel 1. In channel 1, the output from amplifier 21 is again amplified by stage 24 and detected by stage 23 to obtain video pulses. These pulses are then delayed through delay line 41. The delayed pulses are then applied to amplifier 16, which feeds "OR" gate 17, then to a multivibrator stage 19. The foregoing events indicate the frequency in question is within tolerance.

If the frequency in question is not within tolerance, channel two becomes operative. In channel two the input pulse train is applied to amplifier 22 then to frequency discriminator 31. These stages operate as a standard frequency modulation discriminator whose output is modified to pass pulses instead of a unidirectional voltage directly. The discriminator circuit 31 is center-tuned to the frequency in question so that no output pulse is obtained when the center frequency coincides exactly with the frequency in question. The pulses are then applied to an emitter follower and amplifier stage 33. This stage produces output pulses proportional to the deviation from the center frequency. For frequencies below the center frequency, a positive output pulse whose amplitude is proportional to frequency deviation will be produced. For frequencies above the center frequency, a negative pulse will be produced.

If positive pulses appear, they will pass through a negative clipper and amplitude comparator channel comprising the negative clipper 26 and amplifier stage 27 which is an emitter follower and amplifier unit. The pulse is then applied to an amplitude comparator unit 25 which essentially consists of an emitter follower stage. If the pulse level out of stage 27 as applied to the base lead of unit 25 exceeds the threshold voltage on the emitter of stage 25, a negative output pulse is obtained. This pulse is then amplified through amplifier 35 and 36 to trigger an inhibit multivibrator 37. This action is indicative of an out-of-tolerance condition.

If a negative pulse is obtained from stage 33, it is passed through a positive clipper and amplitude comparator channel comprising a positive clipper 39 and an emitter follower and amplifier stage 41. The pulses are then fed to the threshold circuit of the amplitude comparator stage 43. If the pulse applied to the base of this stage exceeds the emitter threshold voltage, a negative output will be obtained. This negative output is amplified through stages 35 and 36 and is applied as a trigger to the inhibit multivibrator 16. The output of the multivibrator inhibits the input pulse to amplifier 16 and again prevents triggering of the monitor output multivibrator.

The output from the monitor output multivibrator stage 19, indicating an in-tolerance operation, is applied through the inhibit circuit 50 and stored in a storage network 51. The unidirectional voltage from the storage network 51 maintains a threshold circuit 55 in a saturated condition. If any prescribed number of output pulses are missing from the output of the monitor output multivibrator unit 19, the storage network 51 will discharge to the extent that the unidirectional output voltage will fall below the threshold voltage on the emitter of the threshold circuit unit 55 thereby switching unit 55 to the cut-off condition. The output will remain locked in this condition due to the feedback of the collector voltage through the emitter follower 51. The output from the threshold circuit unit 55 also switches the indicator alarm 63 to the "ON" position through emitter follower 57. Additionally, this output can also supply an alarm voltage to other alarm voltages such as a local alarm. Also a scan-off trigger 61 can be supplied through a diode in the "OR GATE" 17 to the monitor output multivibrator to prevent a false alarm when data is not continuous, for example, a system direction antenna improperly aligned with the antenna whose pulse radio frequency signal is being received for monitoring purposes. Energization and connection to circuit elements of the system is accomplished through terminal board 64.

We claim:
1. A system for monitoring the deviation from a center frequency comprising:
 (a) a first channel for passing an input signal;
 (b) a second channel in parallel with the first channel including means for blocking on-center frequency input energy and passing off-center frequency input energy;

(c) means for storing said first channel output signals at a storage level;

(d) means for inhibiting said first channel output with the off-center frequency energy from said second channel;

(e) a threshold circuit producing a threshold level and connected to said means for storing first channel output signals;

(f) an alarm connected to the output of said threshold circuit; and (g) means for activating said alarm when said storage level falls below the threshold level.

2. A system for monitoring the deviation from a center frequency comprising:

(a) a first channel for passing input signals including a detector;

(b) a second channel in parallel with said first channel including a frequency discriminator passing off-center input signals and blocking on-center input signals;

(c) a first multivibrator producing an inhibiting signal, dual amplitude comparator channels connecting said frequency discriminator to the multivibrator;

(d) means for blocking the first channel signal with said second channel inhibiting signal connected to the first and second channel output;

(e) a second multivibrator connected to said blocking means;

(f) a storage network fed by the second multivibrator developing a storage level voltage;

(g) a threshold circuit connected to said storage network producing a threshold level voltage;

(h) an alarm connected to said threshold circuit; and (i) means for activating said alarm when the storage level voltage falls below the threshold level voltage.

3. A system for monitoring the deviation from a center frequency comprising:

(a) an input channel for introducing input pulses feeding first and second channels;

(b) said first channel comprising means for detecting the input pulses to obtain video pulses, and means for delaying said video pulses;

(c) said second channel comprising a frequency discriminator rejecting on-center frequency signals and passing off-center frequency signals as positive or negative signals;

(d) a negative clipper and amplitude comparator channel for accepting positive outputs from said frequency discriminator comprising means for negatively clipping said positive output signal and means for generating a first threshold voltage and comparing said negatively clipped signal to said threshold voltage and obtaining an output when said clipped signal exceeds said threshold voltage;

(e) a positive clipper and amplitude comparator channel for accepting negative outputs from said frequency discriminator connected in parallel with said negative clipper and amplitude comparator channel including means for positively clipping said negative output signal and means for generating a second threshold voltage and comparing said positively clipped signal to said threshold voltage and obtaining an output when said clipped signal exceeds said threshold voltage;

(f) a first multivibrator for accepting the outputs from said positive clipping and amplitude comparing channel and from said negative clipping and amplitude comparing channel, said first multivibrator producing an inhibit output signal;

(g) means for inhibiting said first channel signal when said first multivibrator produces said inhibit output signal;

(h) a second multivibrator accepting the passed first channel signal and producing an output signal;

(i) a storage network for storing the output from the second multivibrator at a storage level;

(j) a threshold circuit connected to the output of the storage network producing a threshold voltage;

(k) means for locking the output of said threshold circuit when the storage level falls below the threshold voltage;

(l) an alarm indicator circuit connected to the output of said threshold circuit; and (m) means for activating said alarm circuit when said storage level falls below the threshold voltage.

References Cited

UNITED STATES PATENTS 3,074,018 1/1963 St. Clair _____ 325—134
3,106,679 10/1963 Friedrich _____ 325—2

JOHN W. CALDWELL, *Primary Examiner.*

D. MYER, *Assistant Examiner.*